US010521967B2

(12) United States Patent
Cabanier et al.

(10) Patent No.: US 10,521,967 B2
(45) Date of Patent: *Dec. 31, 2019

(54) DIGITAL CONTENT INTERACTION AND NAVIGATION IN VIRTUAL AND AUGMENTED REALITY

(71) Applicant: Adobe Inc., San Jose, CA (US)

(72) Inventors: Henricus Maria Cabanier, Seattle, WA (US); Yuyan Song, Milpitas, CA (US); Brian David Williams, San Jose, CA (US); Cory Lynn Edwards, Highland, UT (US); Byungmoon Kim, Sunnyvale, CA (US); Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,259

(22) Filed: Jul. 25, 2018

(65) Prior Publication Data

US 2018/0330548 A1    Nov. 15, 2018

Related U.S. Application Data

(63) Continuation of application No. 15/262,616, filed on Sep. 12, 2016, now Pat. No. 10,068,378.

(51) Int. Cl.
*G06T 19/00*   (2011.01)
*G06T 3/40*    (2006.01)
(Continued)

(52) U.S. Cl.
CPC ............ *G06T 19/006* (2013.01); *G06F 3/012* (2013.01); *G06F 3/041* (2013.01); *G06F 3/0488* (2013.01);
(Continued)

(58) Field of Classification Search
None
See application file for complete search history.

(56) References Cited

U.S. PATENT DOCUMENTS 7,893,935 B1  2/2011  Neely et al.
8,217,856 B1  7/2012  Petrou
(Continued)

OTHER PUBLICATIONS

"Augmented Reality & Visual Discovery Solutions | Blippar", Retrieved at: https://blippar.com/en/—on Aug. 22, 2016, 10 pages.
(Continued)

*Primary Examiner* — Ryan M Gray
(74) *Attorney, Agent, or Firm* — SBMC

(57) ABSTRACT

Digital content interaction and navigation techniques and systems in virtual and augmented reality are described. In one example, techniques are employed to aid user interaction within a physical environment in which the user is disposed while viewing a virtual or augmented reality environment. In another example, techniques are described to support a world relative field of view and a fixed relative field of view. The world relative field of view is configured to follow motion of the user (e.g., movement of the user's head or mobile phone) within the environment to support navigation to different locations within the environment. The fixed relative field of view is configured to remain fixed during this navigation such that digital content disposed in this field of view remains at that relative location to a user's field of view.

20 Claims, 11 Drawing Sheets

(51) Int. Cl.
*G06F 3/14* (2006.01)
*G06F 3/01* (2006.01)
*G06F 3/041* (2006.01)
*G06F 3/0488* (2013.01)
*G06F 3/0481* (2013.01)
*G06F 3/0484* (2013.01)

(52) U.S. Cl.
CPC .............. *G06F 3/14* (2013.01); *G06T 3/40* (2013.01); *G06F 3/04817* (2013.01); *G06F 3/04842* (2013.01)

(56) References Cited

U.S. PATENT DOCUMENTS

| | | |
|---|---|---|
| 8,303,387 B2 | 11/2012 | Spivack |
| 8,312,552 B1 | 11/2012 | Hadden et al. |
| 8,745,494 B2 | 6/2014 | Spivack |
| 8,799,810 B1 | 8/2014 | Wheeler |
| 8,825,081 B2 | 9/2014 | Arrasvuori et al. |
| 8,866,847 B2 | 10/2014 | Bedi et al. |
| 9,058,790 B2 | 6/2015 | Kato |
| 9,147,208 B1 | 9/2015 | Argue et al. |
| 9,729,864 B2 | 8/2017 | Stafford |
| 10,068,378 B2 * | 9/2018 | Cabanier ................ G06F 3/012 |
| 10,198,846 B2 | 2/2019 | Carr |
| 10,430,559 B2 | 10/2019 | Anantharaman |
| 2008/0004950 A1 | 1/2008 | Huang et al. |
| 2009/0037822 A1 | 2/2009 | Kandekar et al. |
| 2009/0048908 A1 | 2/2009 | Kaplan et al. |
| 2009/0087024 A1 | 4/2009 | Eaton et al. |
| 2009/0094518 A1 | 4/2009 | Lawther et al. |
| 2010/0082436 A1 | 4/2010 | Maghoul et al. |
| 2010/0226535 A1 | 9/2010 | Kimchi et al. |
| 2011/0258049 A1 | 10/2011 | Ramer et al. |
| 2011/0283223 A1 | 11/2011 | Vaittinen et al. |
| 2012/0030227 A1 | 2/2012 | Mital et al. |
| 2012/0140027 A1 | 6/2012 | Curtis et al. |
| 2012/0272179 A1 | 10/2012 | Stafford |
| 2013/0044912 A1 | 2/2013 | Kulkarni et al. |
| 2013/0050258 A1 | 2/2013 | Liu et al. |
| 2013/0236161 A1 | 9/2013 | Takeda |
| 2013/0258138 A1 | 10/2013 | Ma et al. |
| 2013/0307875 A1 * | 11/2013 | Anderson ............. G06T 19/006 345/633 |
| 2014/0195968 A1 | 7/2014 | Banavara |
| 2014/0268356 A1 | 9/2014 | Bolas et al. |
| 2014/0333664 A1 | 11/2014 | Williams et al. |
| 2015/0058347 A1 | 2/2015 | Russek |
| 2015/0063661 A1 | 3/2015 | Lee et al. |
| 2015/0081604 A1 | 3/2015 | Duque et al. |
| 2015/0120648 A1 | 4/2015 | Slovacek |
| 2015/0213058 A1 | 7/2015 | Ambardekar et al. |
| 2015/0220802 A1 | 8/2015 | Mazur et al. |
| 2015/0227795 A1 | 8/2015 | Starner et al. |
| 2015/0234796 A1 | 8/2015 | Williams et al. |
| 2015/0243078 A1 | 8/2015 | Watson et al. |
| 2015/0254892 A1 | 9/2015 | Smith et al. |
| 2015/0324698 A1 | 11/2015 | Karaoguz et al. |
| 2015/0348322 A1 | 12/2015 | Ligameri et al. |
| 2016/0027214 A1 | 1/2016 | Memmott et al. |
| 2016/0055201 A1 | 2/2016 | Poupyrev et al. |
| 2016/0093105 A1 | 3/2016 | Rimon et al. |
| 2016/0112667 A1 | 4/2016 | Park et al. |
| 2016/0133052 A1 | 5/2016 | Choi et al. |
| 2016/0343107 A1 | 11/2016 | Newman et al. |
| 2016/0364916 A1 * | 12/2016 | Terahata ............... G02B 27/017 |
| 2017/0026577 A1 | 1/2017 | You et al. |
| 2017/0061696 A1 | 3/2017 | Li et al. |
| 2017/0064374 A1 | 3/2017 | Eim et al. |
| 2017/0153698 A1 | 6/2017 | Bamidele et al. |
| 2017/0160815 A1 | 6/2017 | Glazier et al. |
| 2017/0163839 A1 | 6/2017 | Arana et al. |
| 2017/0201808 A1 | 7/2017 | Chowdhary et al. |
| 2017/0266554 A1 | 9/2017 | Marks et al. |
| 2017/0269685 A1 | 9/2017 | Marks et al. |
| 2017/0269713 A1 | 9/2017 | Marks et al. |
| 2017/0277256 A1 | 9/2017 | Burns et al. |
| 2017/0372401 A1 | 12/2017 | Wang et al. |
| 2018/0005443 A1 * | 1/2018 | Poulos .................... G06F 3/017 |
| 2018/0039479 A1 | 2/2018 | Fransen et al. |
| 2018/0041750 A1 | 2/2018 | Kim |
| 2018/0046363 A1 | 2/2018 | Miller et al. |
| 2018/0053236 A1 | 2/2018 | Fransen et al. |
| 2018/0053333 A1 | 2/2018 | Carr |
| 2018/0059898 A1 | 3/2018 | Miller et al. |
| 2018/0061128 A1 | 3/2018 | Cabanier et al. |
| 2018/0075655 A1 | 3/2018 | Cabanier et al. |
| 2018/0107805 A1 | 4/2018 | Anantharaman |
| 2018/0188801 A1 | 7/2018 | Leppanen et al. |

OTHER PUBLICATIONS

"Corrected Notice of Allowance", U.S. Appl. No. 15/262,616, dated May 8, 2018, 11 pages.

"Final Office Action", U.S. Appl. No. 15/243,130, dated Apr. 18, 2018, 14 pages.

"Final Office Action", U.S. Appl. No. 15/244,656, dated Sep. 21, 2017, 48 pages.

"First Action Interview Office Action", U.S. Appl. No. 15/227,300, dated Jun. 5, 2018, 5 pages.

"First Action Interview Office Action", U.S. Appl. No. 15/228,680, dated Jul. 5, 2018, 11 pages.

"First Action Interview Office Action", U.S. Appl. No. 15/262,616, dated Nov. 2, 2017, 3 pages.

"Non-Final Office Action", U.S. Appl. No. 15/244,656, dated Jun. 14, 2017, 29 pages.

"Non-Final Office Action", U.S. Appl. No. 15/244,656, dated Jun. 28, 2018, 70 pages.

"Non-Final Office Action", U.S. Appl. No. 15/297,032, dated Dec. 1, 2017, 17 pages.

"Notice of Allowance", U.S. Appl. No. 15/262,616, dated Apr. 27, 2018, 14 pages.

"PAVR Creates Emmy Award-Winning 360-Degree Video for Fox Sports", The Creative Cloud Team—Retrieved at: http://blogs.adobe.com/creativecloud/pavr-creates-emmy-award-winning-360-degree-video-for-fox-sports/, Jul. 13, 2016, 3 pages.

"Pre-Interview Communication", U.S. Appl. No. 15/227,300, dated Feb. 5, 2018, 3 pages.

"Pre-Interview Communication", U.S. Appl. No. 15/228,680, dated May 17, 2018, 11 pages.

"Pre-Interview Communication", U.S. Appl. No. 15/243,130, dated Dec. 8, 2017, 16 pages.

"Pre-Interview Communication", U.S. Appl. No. 15/262,616, dated Sep. 21, 2017, 3 pages.

"Pre-Interview First Office Action", U.S. Appl. No. 15/233,532, dated Jun. 1, 2018, 4 pages.

"Restriction Requirement", U.S. Appl. No. 15/246,137, dated Jul. 20, 2018, 6 pages.

Chuang,"Animating Pictures with Stochastic Motion Textures", ACM Transactions on Graphics, vol. 24, No. 3, to appear, (Proceedings of ACM SIGGRAPH 2005, Jul. 2005, Los Angeles), Jul. 2005, 8 pages.

Conner-Simons,"Reach in and Touch Objects in Videos with "Interactive Dynamic Video"", Retrieved at: https://www.csail.mit.edu/reach_in_and_touch_objects_in_videos_with%20_interactive_dynamic_video, Aug. 2, 2016, 3 pages.

Dailey,"EMPATH: A Neural Network that Categorizes Facial Expressions", Journal of cognitive neuroscience 14.8, 2002, pp. 1158-1173.

Fei-Fei,"A Bayesian Hierarchical Model for Learning Natural Scene Categories", Computer Vision and Pattern Recognition, 2005, 8 pages.

Lumb,"New MIT tech lets you mess with objects in pre-recorded video—Yes, they've already successfully tested it in Pokémon Go.'", Retrieved at: https://www.engadget.com/2016/08/03/new-mit-tech-lets-you-mess-with-objects-in-pre-recorded-video/, Aug. 3, 2016, 2 pages.

(56) References Cited

OTHER PUBLICATIONS

"Non-Final Office Action", U.S. Appl. No. 15/227,300, dated Mar. 22, 2019, 12 pages.
"Final Office Action", U.S. Appl. No. 15/244,656, dated Jan. 28, 2019, 62 pages.
"Final Office Action", U.S. Appl. No. 15/227,300, dated Nov. 30, 2018, 15 pages.
"Final Office Action", U.S. Appl. No. 15/228,680, dated Oct. 12, 2018, 52 pages.
"Final Office Action", U.S. Appl. No. 15/233,532, dated Nov. 1, 2018, 29 pages.
"First Action Interview Office Action", U.S. Appl. No. 15/246,137, dated Dec. 6, 2018, 3 pages.
"Notice of Allowance", U.S. Appl. No. 15/243,130, dated Oct. 24, 2018, 13 pages.
"Advisory Action", U.S. Appl. No. 15/297,032, dated Aug. 1, 2018, 5 pages.
"Blippar: Augmented Reality App Turns Everyday Products into Interactive Experience", Business NewsDaily, https://www.businessnewsdaily.com/5627-blippar-app.html, Dec. 16, 2013, 3 pages.
"Final Office Action", U.S. Appl. No. 15/297,032, dated Aug. 16, 2018, 17 pages.
"First Action Interview Office Action", U.S. Appl. No. 15/233,532, dated Aug. 28, 2018, 4 pages.
"Non-Final Office Action", U.S. Appl. No. 15/246,137, dated Sep. 10, 2018, 20 pages.
"Pre-Interview First Office Action", U.S. Appl. No. 15/246,137, dated Sep. 21, 2018, 5 pages.
"Final Office Action", U.S. Appl. No. 15/246,137, dated May 3, 2019, 23 pages.
"Non-Final Office Action", U.S. Appl. No. 15/228,680, dated Jun. 11, 2019, 61 pages.
"Notice of Allowance", U.S. Appl. No. 15/297,032, dated May 22, 2019, 16 pages.
"Restriction Requirement", U.S. Appl. No. 15/238,374, dated May 24, 2019, 7 pages.
"First Action Interview Office Action", U.S. Appl. No. 15/238,374, filed Nov. 13, 2019, 30 pages.
"Corrected Notice of Allowability", U.S. Appl. No. 15/227,300, filed Nov. 7, 2019, 2 pages.
"Non-Final Office Action", U.S. Appl. No. 15/233,532, filed Aug. 8, 2019, 37 pages.
"Non-Final Office Action", U.S. Appl. No. 15/238,374, filed Sep. 6, 2019, 29 pages.
"Non-Final Office Action", U.S. Appl. No. 15/246,137, filed Oct. 4, 2019, 32 pages.
"Notice of Allowance", U.S. Appl. No. 15/227,300, filed Aug. 28, 2019, 5 pages.
"Pre-Interview First Office Action", U.S. Appl. No. 15/238,374, filed Sep. 16, 2019, 31 pages.

* cited by examiner

DIGITAL CONTENT INTERACTION AND NAVIGATION IN VIRTUAL AND AUGMENTED REALITY

CLAIM OF PRIORITY

This application is a continuation of and claims priority to U.S. patent application Ser. No. 15/262,616, filed Sep. 12, 2016, entitled "Digital Content Interaction and Navigation in a Virtual and Augmented Reality", the entire disclosure of which is hereby incorporated by reference herein in its entirety.

BACKGROUND

Techniques have been developed to expand a richness in display and interaction with digital content. Examples of this include virtual reality and augmented reality. In augmented reality, a user experience is created by a computing device that employs digital content (e.g., virtual objects) to augment a user's direct view of a physical environment in which the user is disposed. In other words, this direct view of the physical environment is not recreated as part of an augmented reality environment but rather the user actually "sees what is there." The digital content is then used to augment the user's view of this physical environment, such as to play a building game of virtual blocks on a physical table top. On the other hand, in virtual reality the computing device generates a user experience that uses digital content to recreate a user's environment such that the physical environment is not viewable by the user. Accordingly, in virtual reality an entirety of the user's view of created virtually as part of the environment by the computing device.

Although user experiences in both virtual and augmented reality may expand a richness of what may be viewed by the user, both of these experiences have similar drawbacks regarding how a user may interact with virtual objects included as part of these experiences. In augmented reality, for instance, the user is not provided with haptic feedback regarding interaction with virtual object shown as part of the user's physical environment, such as to grasp a virtual block. This causes the user's experience with the virtual objects to differ from that of actual physical objects that are viewable by the user.

This drawback is further exacerbated in virtual reality in which an entirety of the user's environment is recreated through use of virtual objects, such that the user may be unable to differentiate between virtual objects used to recreate physical objects in the physical environment and virtual objects that do not recreate such objects. Additionally, when configured as an immersive (e.g., 360-degree view) environment, the size may make it difficult to navigate and move digital content using conventional techniques. Accordingly, user interaction as part of augmented and virtual reality user experiences may feel unnatural and limited as compared with user interaction in an actual physical environment.

SUMMARY

Digital content interaction and navigation techniques and systems in virtual and augmented reality are described. In one example, techniques are employed to aid user interaction within a physical environment in which the user is disposed while viewing a virtual or augmented reality environment. A computing device detects physical interaction of a user that is associated with a physical device, e.g., keyboard, mouse, tablet. In response, the computing device generates digital content to aid the detected physical interaction. This digital content may take a variety of forms. In one such instance, the digital content represents the physical interaction. In another such instance, the digital content is used to generate a virtual viewport, e.g., by representing the physical device in a virtual reality environment or providing a direct view through digital content in an augmented reality environment.

In another example, techniques are described to support a world relative field of view and a fixed relative field of view. The world relative field of view is configured to follow motion of the user (e.g., movement of the user's head or mobile phone) within the environment to support navigation to different locations within the environment. The fixed relative field of view is configured to remain fixed during this navigation such that digital content disposed in this field of view remains at that relative location to a user's field of view, such as to maintain icons, use as a "dock," and so on. In this way, this fixed relative field of view may aid navigation and interaction of a user with digital content within these expansive augmented and virtual user experiences.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
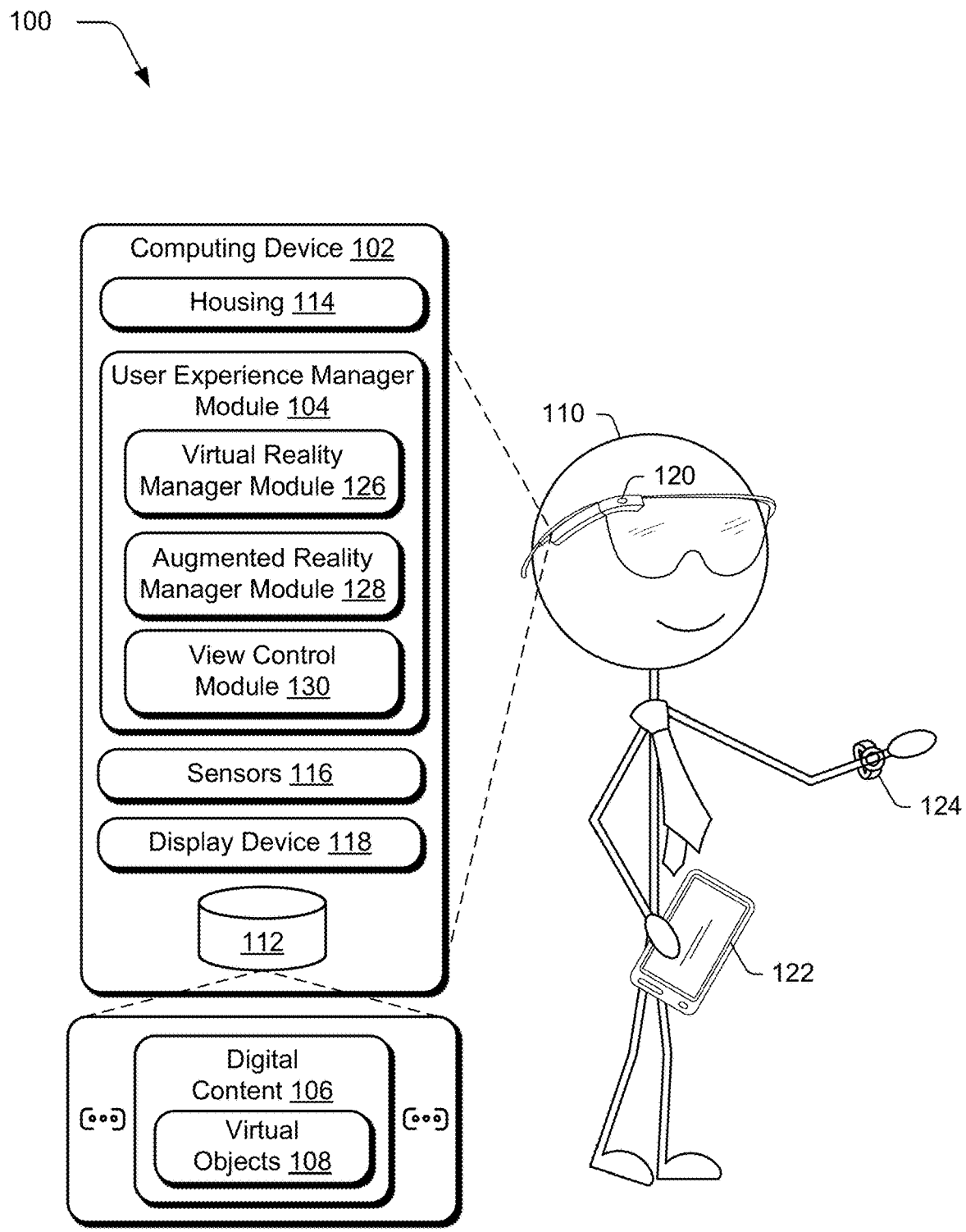
FIG. 1 is an illustration of an environment in an example implementation that is operable to employ techniques described herein.

User experiences generated by a computing device that employ augmented or virtual reality, although increasing a richness of a display of digital content to a user, are limited in how a user may interact with virtual objects generated as part of these experiences. A user, for instance, is not provided with haptic feedback regarding interaction with virtual objects in conventional augmented and virtual reality experiences. Further, although a user may be immersed as part of the augmented and virtual reality experiences such that the user is surrounded by this digital content, this may cause difficulties in navigation of content within these experiences due to this immersion. For example, a user may experience difficulty in moving virtual objects from one location to another within these experiences due to a perceived size of the experiences.

Digital content interaction and navigation techniques and systems in virtual and augmented reality are described. In one example, techniques are employed to aid user interaction within a physical environment in which the user is disposed while viewing a virtual or augmented reality environment. As previously described, in an augmented reality environment virtual objects are used to augment a user's view of a physical environment. As part of this physical environment, the user may also interact with physical devices such a keyboards, a mouse, stylus, and so on that are used to initiate operations and interaction with the computing device. In some instances, however, the virtual objects may obstruct a user's view of these physical devices and thus hinder a user's interaction. This is especially problematic in virtual reality environments in which an entirety of the environment is generated for viewing by the user.

To do so in this example, the computing device detects physical interaction of a user that is associated with a physical device, e.g., keyboard, mouse, tablet. This may include use of a camera to detect when a user is within a threshold distance from the physical device, movement of the physical device (e.g., a user has grasped the device), and so forth.

In response, the computing device generates digital content to aid the detected physical interaction. This digital content may take a variety of forms. In one such instance, the digital content represents the physical interaction. The digital content may be used to represent the physical device in a virtual reality environment such that the device "appears" within this environment. This may also include a representation of a portion of the user, e.g., the user's hand In this way, the digital content may be used to guide a user's physical interaction with the physical device.

In another such instance, the digital content is used to generate a virtual viewport, e.g., by representing the physical device in a virtual reality environment or providing a direct view through digital content in an augmented reality environment. The virtual viewport in a virtual user experience may be used to recreate a user's physical environment. In an augmented reality environment, this may be used to provide an opening "through" virtual objects used to augment the user's physical environment such that a user may directly view this physical interaction. Further discussion of these and other examples is described in relation to FIGS. 2-7, including leverage of physical devices to provide haptic feedback within a virtual or augmented reality environment.

In another example, augmented and virtual user experiences are used to provide an immersive experience for viewing by a user. As part of this, the user is surrounded by digital content and thus may improve an expansiveness of the user's interaction with this content. However, this expansiveness may also make it difficult to navigate and move content within the environment. A user, for instance, may desire to organize digital content at different locations within the environment. Conventional techniques to do so, however, may lack intuitiveness and may be difficult to perform correctly.

Accordingly, techniques are described to support a world relative field of view and a fixed relative field of view. The world relative field of view is configured to follow motion of the user (e.g., movement of the user's head or mobile phone) within the environment to support navigation to different locations within the environment. The fixed relative field of view is configured to remain fixed during this navigation such that digital content disposed in this field of view remains at that relative location to a user's field of view.

The fixed relative field of view may be used to support a variety of different functionality, such as to include icons similar to a desktop, a virtual basket (e.g., dock) for selection of items of digital content for movement within the environment or purchase of a good or service, and so forth. In the dock example, the user may place a virtual object in the dock when viewing one location of a virtual or augmented reality environment, navigate to a second location (e.g., through movement of the user's head), and the move the virtual object from the dock to this second location. In this way, this fixed relative field of view may aid navigation and interaction of a user with digital content within these expansive augmented and virtual user experiences. Further discussion of these and other examples is described in relation to FIGS. 8-10.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102 configured for use in augmented reality and/or virtual reality scenarios, which may be configured in a variety of ways.

Figure 11:
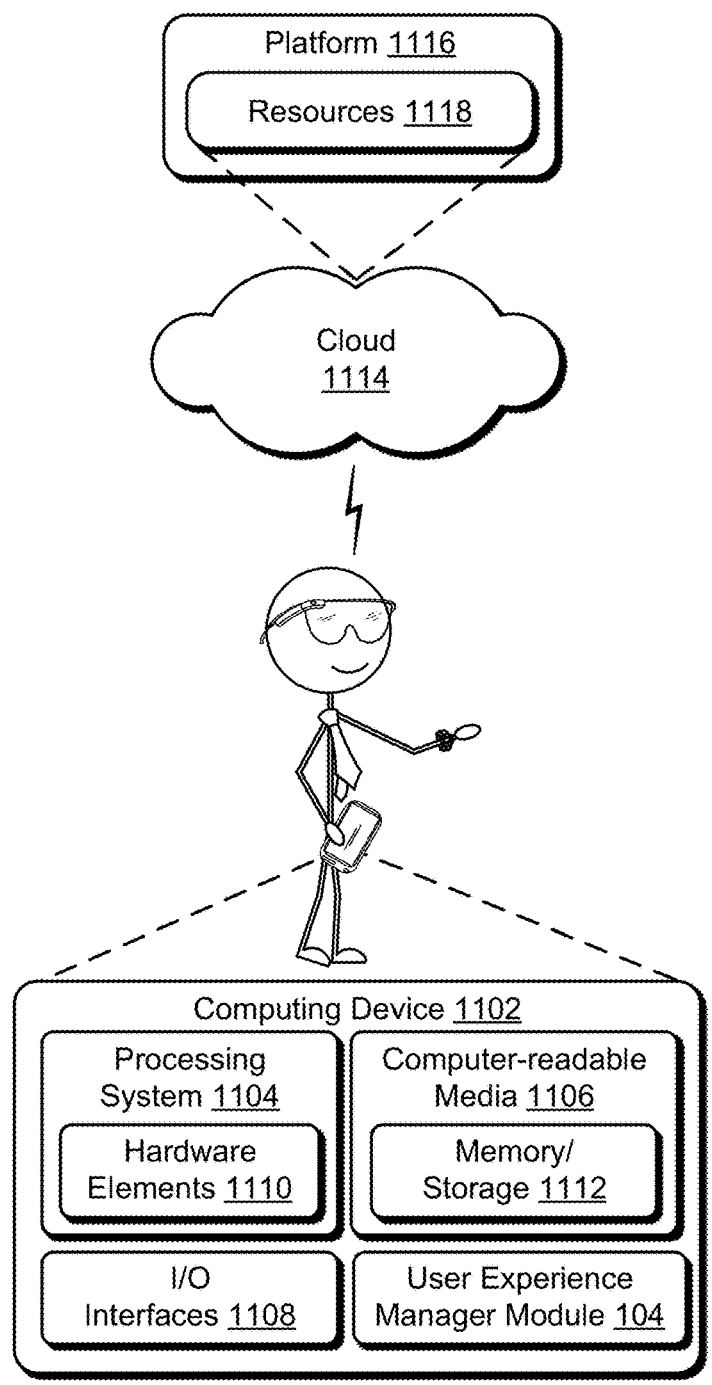
FIG. 11 illustrates an example system including various components of an example device that can be implemented as any type of computing device as described and/or utilize with reference to FIGS. 1-10 to implement embodiments of the techniques described herein.

The computing device 102 is illustrated as including a user experience manager module 104 that is implemented at least partially in hardware of the computing device 102, e.g., a processing system and memory of the computing device as further described in relation to FIG. 11. The user experience manager module 104 is configured to manage output of and user interaction with a digital content 106. The digital content 106 is illustrated as maintained in storage 112 of the computing device 102.

The computing device 102 includes a housing 114, one or more sensors 116, and a display device 118. The housing 114 is configurable in a variety of ways to support interaction with the digital content 106. In one example, the housing 114 is configured to be worn on the head of a user 110 (i.e., is "head mounted" 120), such as through configuration as goggles, glasses, contact lens, and so forth. In another example, the housing 114 assumes a hand-held 122 form factor, such as a mobile phone, tablet, portable gaming device, and so on. In yet another example, the housing 114 assumes a wearable 124 form factor that is configured to be worn by the user 110, such as a watch, broach, pendant, or ring. Other configurations are also contemplated, such as configurations in which the computing device 102 is disposed in a physical environment apart from the user 110, e.g., as a "smart mirror," wall-mounted projector, television, and so on.

The sensors 116 may also be configured in a variety of ways to detect a variety of different conditions. In one example, the sensors 116 are configured to detect an orientation of the computing device 102 in three-dimensional space, such as through use of accelerometers, magnetometers, inertial devices, radar devices, and so forth. In another example, the sensors 116 are configured to detect environmental conditions of a physical environment in which the computing device 102 is disposed, such as objects, distances to the objects, motion, colors, and so forth. A variety of sensor configurations may be used, such as cameras, radar devices, light detection sensors (e.g., IR and UV sensors), time of flight cameras, structured light grid arrays, barometric pressure, altimeters, temperature gauges, compasses, geographic positioning systems (e.g., GPS), and so forth. In a further example, the sensors 116 are configured to detect environmental conditions involving the user 110, e.g., heart rate, temperature, movement, and other biometrics.

The display device 118 is also configurable in a variety of ways to support a virtual user experience. Examples of which include a typical display device found on a mobile device such as a camera or tablet computer, a light field display for use on a head mounted display in which a user may see through portions of the display, stereoscopic displays, projectors, television (e.g., a series of curved screens arranged in a semicircular fashion), and so forth. Other hardware components may also be included as part of the computing device 102, including devices configured to provide user feedback such as haptic responses, sounds, and so forth.

The housing 114, sensors 116, and display device 118 are also configurable to support different types of user experiences by the user experience manager module 104. In one example, a virtual reality manager module 126 is employed to support virtual reality. In virtual reality, a user is exposed to an immersive environment, the viewable portions of which are entirely generated by the computing device 102. In other words, everything that is seen by the user 110 is rendered and displayed by the display device 118 through use of the virtual reality manager module 126 by rendering of the digital content 106.

The user, for instance, may be exposed to virtual objects as part of the digital content 106 that are not "really there" (e.g., virtual bricks) and are displayed for viewing by the user in an environment that also is completely computer generated. The computer-generated environment may also include representations of physical objects included in a physical environment of the user 110, e.g., a virtual table that is rendered for viewing by the user 110 to mimic an actual physical table in the environment detected using the sensors 116. On this virtual table, the virtual reality manager module 126 may also dispose virtual objects that are not physically located in the physical environment of the user 110, e.g., the virtual bricks as part of a virtual playset. In this way, although an entirely of the display being presented to the user 110 is computer generated, the virtual reality manager module 126 may represent physical objects as well as virtual objects within the display.

The user experience manager module 104 is also illustrated as supporting an augmented reality manager module 128. In augmented reality, the digital content 106 is used to augment a direct view of a physical environment of the user 110. The augmented reality manger module 128, for instance, may detect landmarks of the physical table disposed in the physical environment of the computing device 102 through use of the sensors 116, e.g., object recognition. Based on these landmarks, the augmented reality manager module 128 configures the digital content 106 to be viewed within this environment.

The user 110, for instance, may view the actual physical environment through head-mounted 120 goggles. The head-mounted 120 goggles do not recreate portions of the physical environment as virtual representations as in the VR scenario above, but rather permit the user 110 to directly view the physical environment without recreating the environment. The digital content 106 is then displayed by the display device 118 to appear as disposed within this physical environment. Thus, in augmented reality the digital content 106 augments what is "actually seen" by the user 110 in the physical environment. In the following discussion, the digital content 106 may be rendered by the user experience manager module 104 in both a virtual reality scenario and an augmented reality scenario.

The user experience manager module 104 is also illustrated as including a view control module 130. The view control module is implemented at least partially in hardware of a computing device to control digital content navigation and interaction in virtual and augmented reality environments. In one example, techniques are employed to aid user interaction within a physical environment in which the user is disposed while viewing a virtual or augmented reality environment as further described in relation to FIGS. 2-7. In another example, techniques are described to support a world relative field of view and a fixed relative field of view. The world relative field of view is configured to follow motion of the user (e.g., movement of the user's head or mobile phone) within the environment to support navigation to different locations within the environment. The fixed relative field of view is configured to remain fixed during this navigation such that digital content disposed in this field of view remains at that relative location to a user's field of view, such as to maintain icons, use as a "dock," and so on. Further discussion of this example is described in relation to FIGS. 8-10 in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Content Generation and Physical Devices

Figure 2:
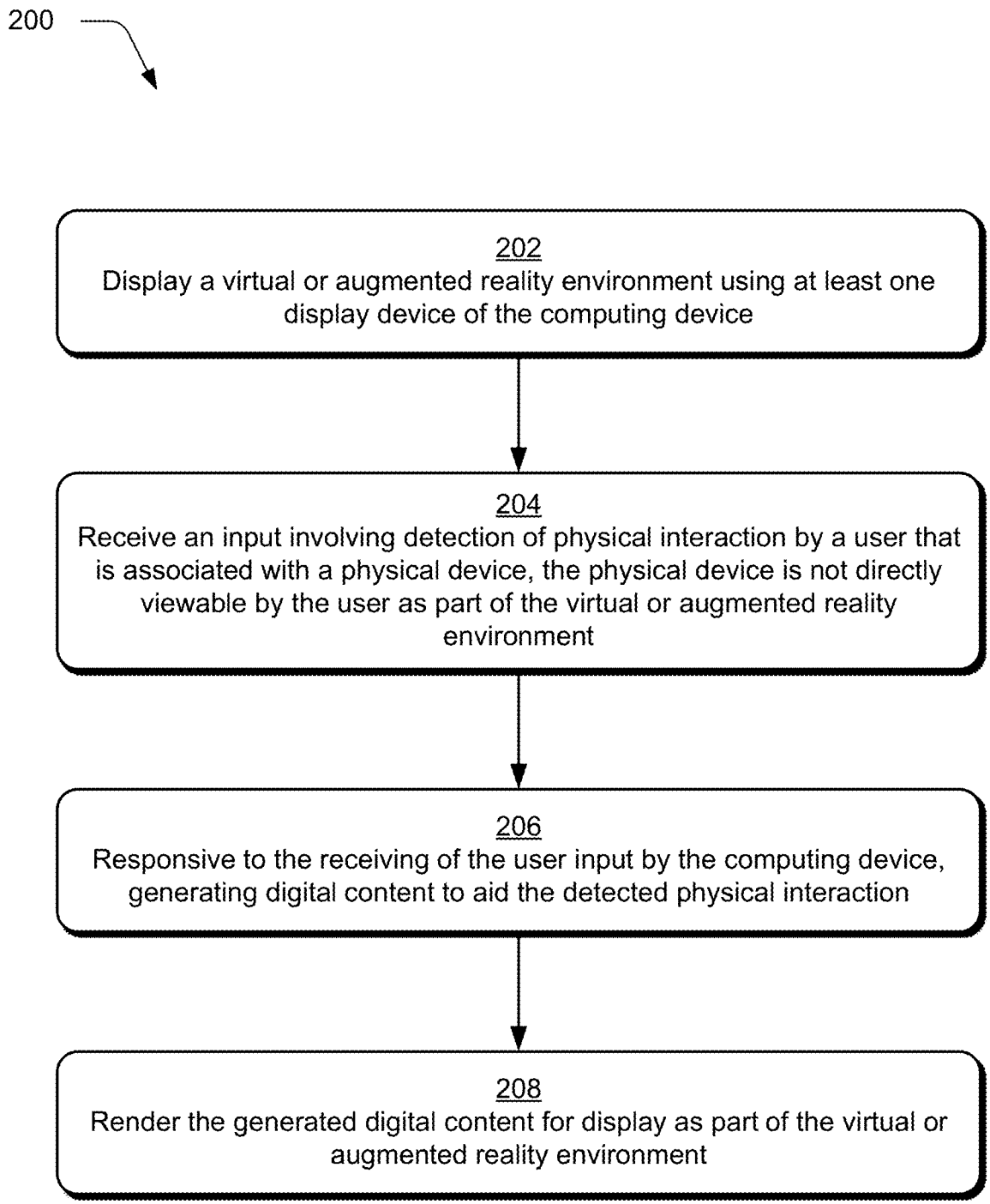
FIG. 2 depicts a procedure in an example implementation in which digital content is generated to mimics physical interaction of a user with a physical device.
Figure 3:
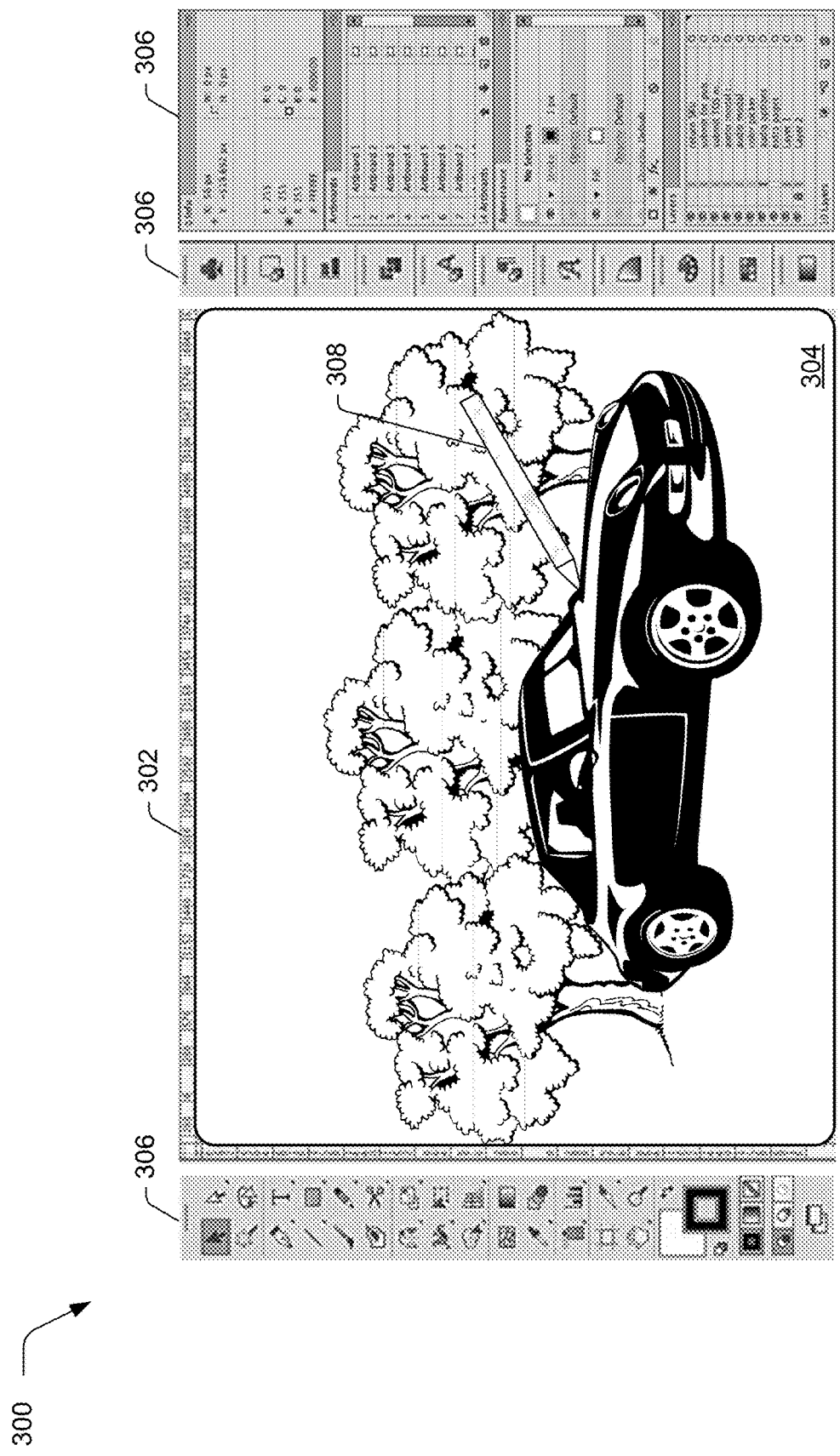
FIG. 3 depicts a system in an example implementation showing an example of generated digital content that represents a physical device as a stylus.
Figure 4:
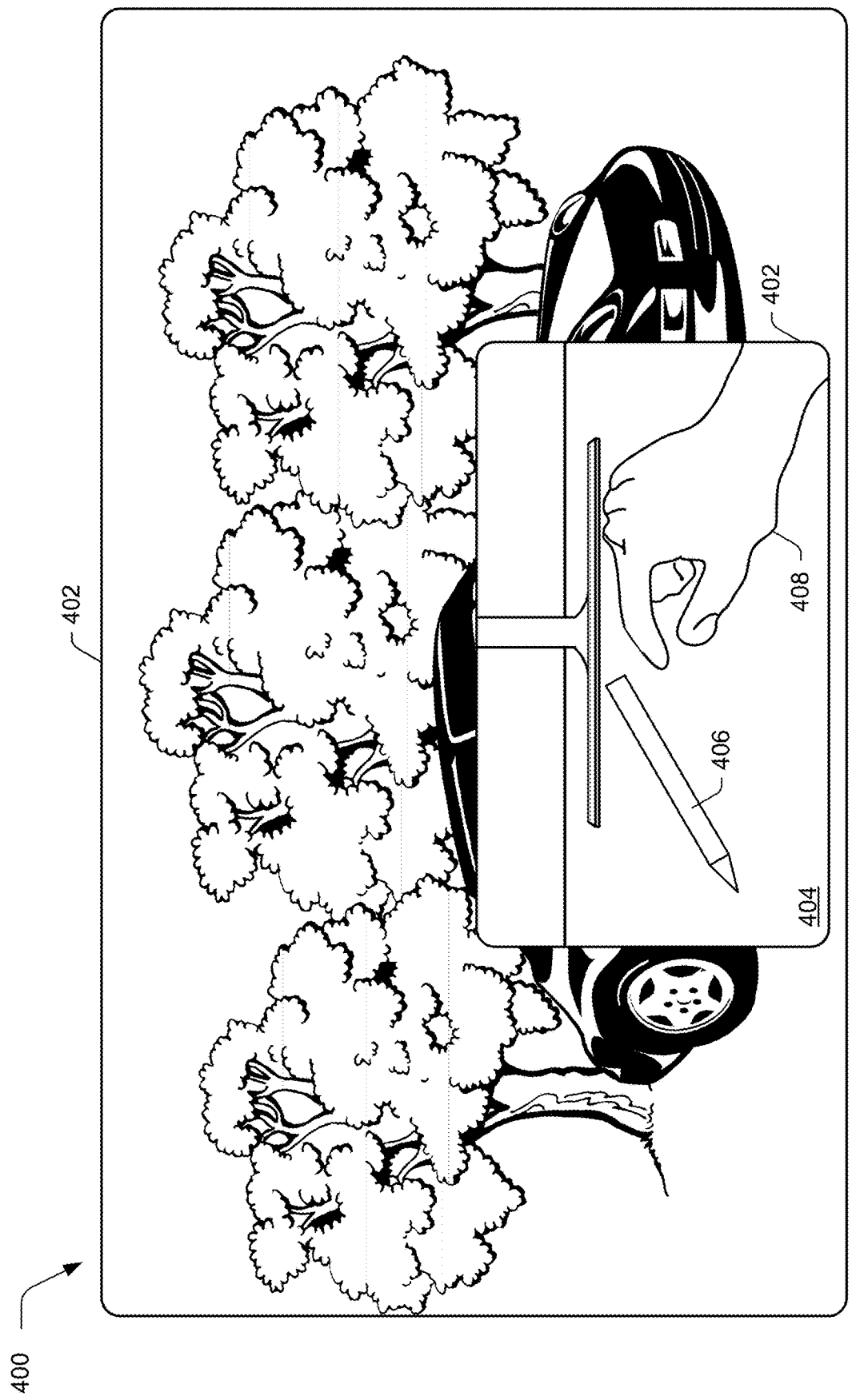
FIG. 4 depicts a system in an example implementation in which digital content is generated as a virtual viewport via which a user may receive feedback regarding interaction with a physical device.

FIG. 2 depicts a procedure 200 in an example implementation in which digital content is generated to mimics physical interaction of a user with a physical device. FIG. 3 depicts a system 300 in an example implementation showing an example of generated digital content that represents a physical device as a stylus. FIG. 4 depicts a system 400 in an example implementation in which digital content is generated as a viewport via which a user may receive feedback regarding interaction with a physical device.

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 1-4.

To begin, a virtual or augmented reality environment is displayed using at least one display device of the computing device (block 202). As shown in FIG. 3, a user interface 302 is shown that is viewable using the display device 118 as part of an augmented or virtual reality by the computing device 102 of FIG. 1. The illustrated user interface 302 is configured to create a digital image 304 and includes representations of tools 306 selectable by the user 110 to do so.

An input is received involving detection of physical interaction by a user that is associated with a physical device. The physical device is not directly viewable by the user as part of the virtual or augmented reality environment (block 204), e.g., when the input is received. In this example, the physical device is not directly viewable by the user 110 because of obstruction caused by virtual objects 108 of digital content 106 when the input is detected. In a virtual reality environment, this is because an entirety of the user's view is generated by the digital content 106 as part of an immersive environment. Thus, the user may not directly view the physical device through this digital content 106. In an augmented reality environment, virtual objects 108 of the digital content 106 may obstruct the user's view of the physical device, such as a user interface 302 of FIG. 3.

Sensors 116 of the computing device 102, for instance, may detect that a hand of the user 110 has moved within a threshold distance (e.g., six inches) of the physical device. Physical devices may assume a variety of configurations. This may include peripheral devices communicatively coupled with the computing device 102 to initiate operations of the computing device 102, such as input devices including a keyboard, cursor control device (e.g., mouse, trackpad), a stylus, and so on. Other examples of physical devices are also contemplated that initiate operations as controlled by the computing device 102, such as output devices including a microphone, a headset, and so forth.

The physical device may also be configured as another computing device and not a peripheral device, e.g., a mobile phone or tablet computer of the user that is configured to communicate with the computing device 102. Thus, in these examples the physical device is configured to engage in operations directly with the computing device 102. Other examples are also contemplated, such as coffee cups, a stapler, a pen, a pad of paper, and so forth. In this way, the user experience manager module 104 may determine a likely intent of a user to interact with a physical device (e.g., a motion to grasp or hold the device) and configure the digital content 106 in a manner that aids this interaction, regardless of whether that interaction involves initiating related operations of the computing device 102. For example, the techniques described herein may be used to aid interaction with devices as part of the user's 110 interaction with the computing device 102, such as peripheral devices, input/output devices, and so on. This may also be used to aid interaction with other objects in a physical environment of the user 110, such as to drink from a coffee cup.

The sensors 116 used by the computing device 102 to detect the physical interaction may also be configured in a variety of ways. This includes configuration as a camera and use of object recognition (e.g., forward facing camera), a radar device (e.g., a Wi-Fi radar wave device), ultrasonic device, capacitive sensors, and so on. Other sensors may also be used, such as sensors of the physical device itself, such as to detect movement of the physical device, proximity to the device (e.g., capacitive sensors of a touchscreen), and so forth.

Responsive to the receipt of the input by the computing device, digital content 106 is generated to aid the detected physical interaction (block 206). The generated digital content 106 is then rendered for display as part of the virtual or augmented reality environment (block 208). The user experience manager module 104, for instance, may generate digital content 106 that represents the detected physical interaction. As shown in FIG. 3, for instance, digital content 308 is generated that represents a physical stylus, with which, a user is interacting to create the digital image 304. In this way, the user 110 is provided feedback regarding "where" the physical stylus is positioned in relation to the user interface 302 through the representation of the physical stylus using the digital content 308. In the illustrated example, the digital content 308 representing the physical stylus is at least partially translucent such that portions of the user interface are viewable "through" the digital content 308, and thus provides an expanded view to the user.

A similar technique may be used to generate digital content used to guide a user towards a location of the physical device, and thus guides interaction with the device. As shown in FIG. 4, for instance, the computing device 102 may detect that a hand of the user is within a threshold distance of a stylus. In response, digital content is generated to aid this interaction. In an augmented reality environment, for instance, a user interface 402 generated using digital content is transformed to include a viewport 404 via which a user may view a physical environment in which the user is disposed that includes the physical device 406 and a body part (e g, hand 408) of the user that is involved in this interaction. Once a user has grasped the physical device, output of the viewport 404 may cease such that an entirety of the user interface 402 is again viewable by the user 110. Other examples are also contemplated, such as to continue output such as to aid a user in drinking from a coffee cup. As such, different settings may be set for different types of devices to control "how long" the digital content is output.

In a virtual reality environment, the digital content may be generated to create a representation of this interaction. The viewport 404, for instance, may also be created within the user interface 402. The viewport 404 includes digital content that recreates a view of the user's 110 physical surroundings by representing both the physical device (e.g., the stylus 406) and an appendage of the user 110 (e.g., the user's hand 408). Thus, this digital content 402 may be generated to guide the user's hand toward the stylus. As above, once a user has grasped the physical device, output of the viewport 404 may cease or continue to guide further interaction as desired by the user 110, e.g., through a user-specified setting.

Accordingly, in both examples the digital content is configured to aid a user's interaction with a physical device. The digital content may also leverage a user's interaction with the physical device to provide haptic feedback to a user within an augmented or virtual reality environment, an example of which is described in the following section.

Figure 5:
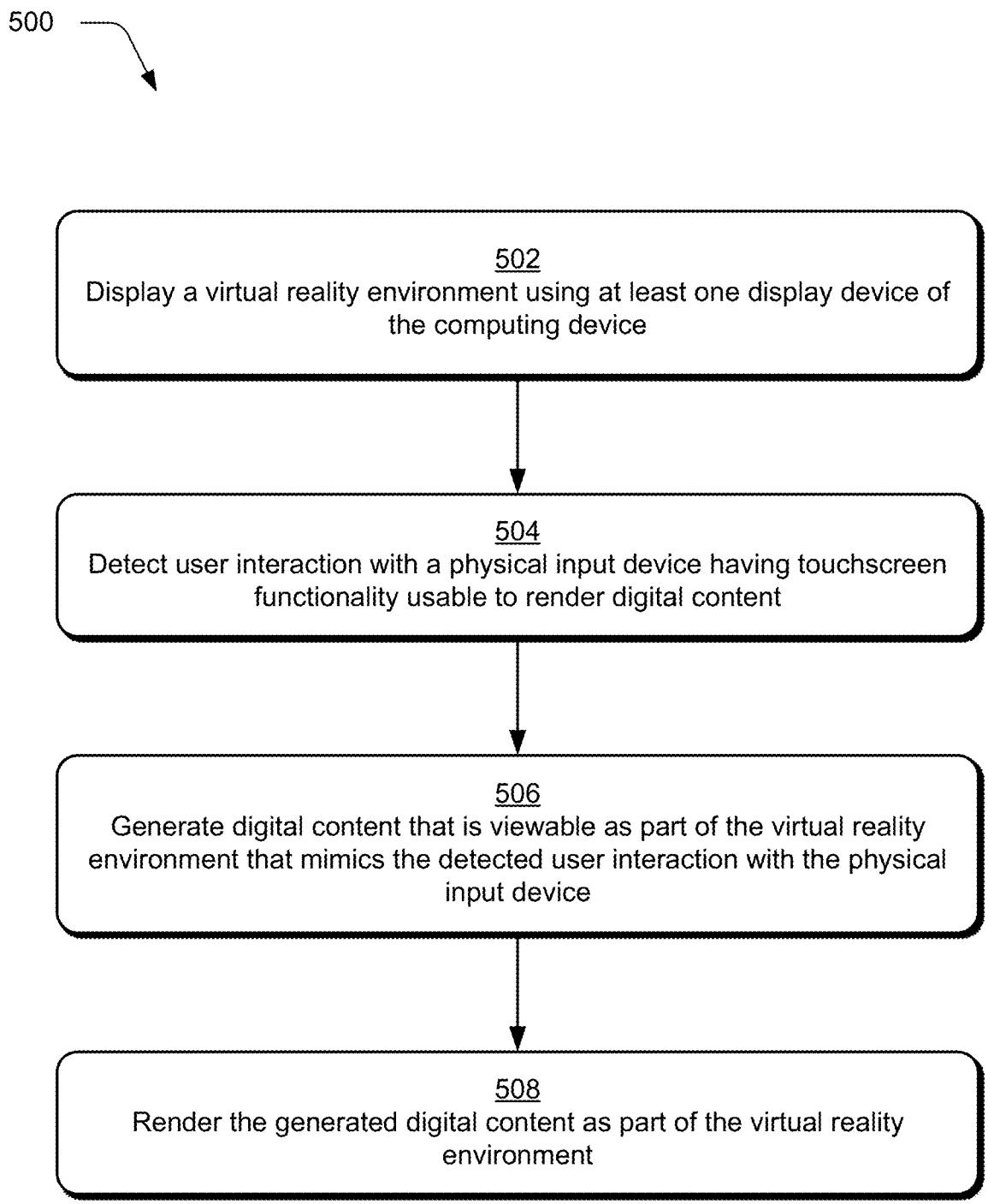
FIG. 5 depicts a procedure in an example implementation in which digital content is generated to mimics physical interaction of a user with a physical device to provide haptic feedback.
Figure 6:
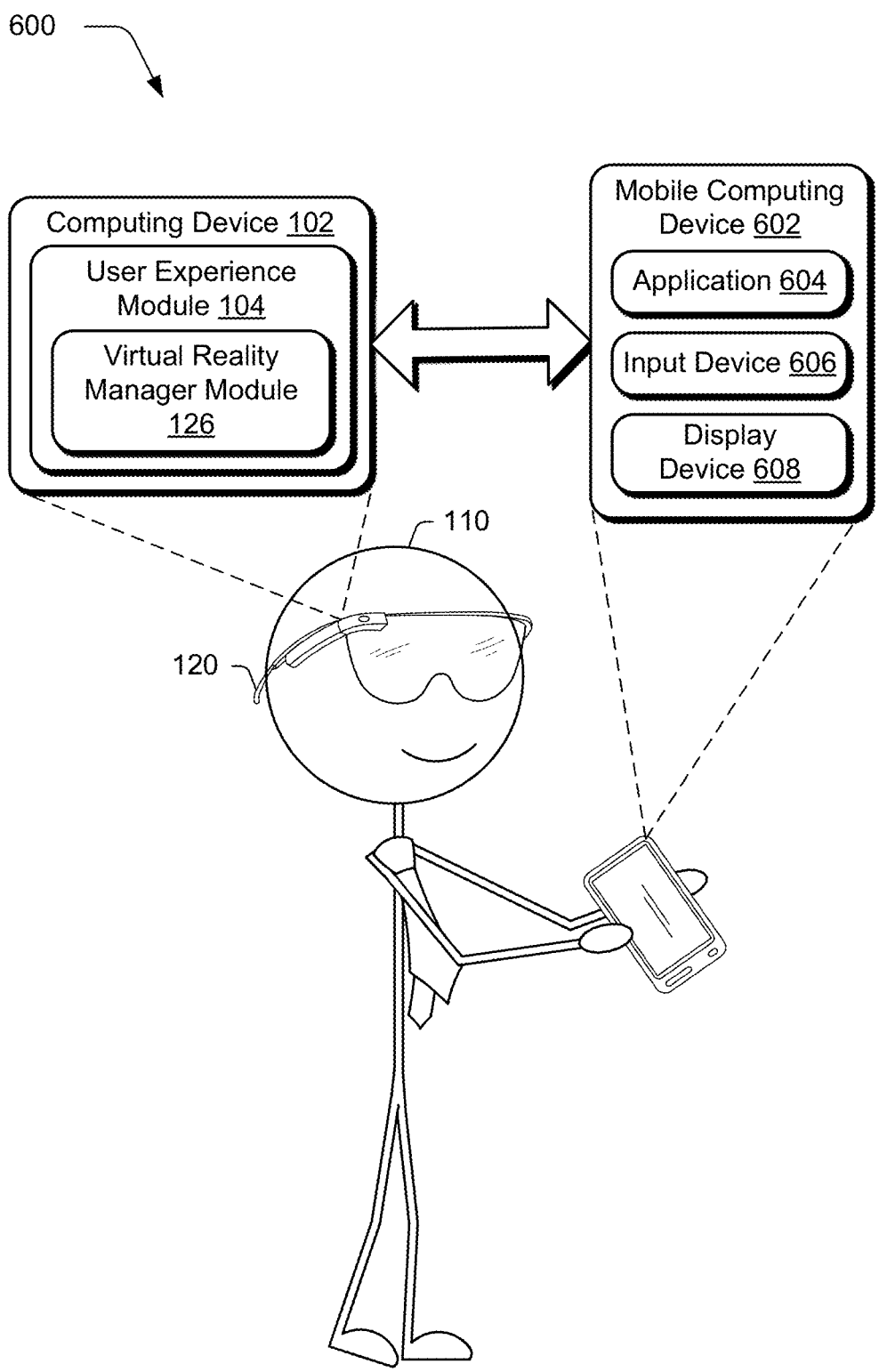
FIG. 6 depicts a system in an example implementation showing an example of user interaction with a physical device.
Figure 7:
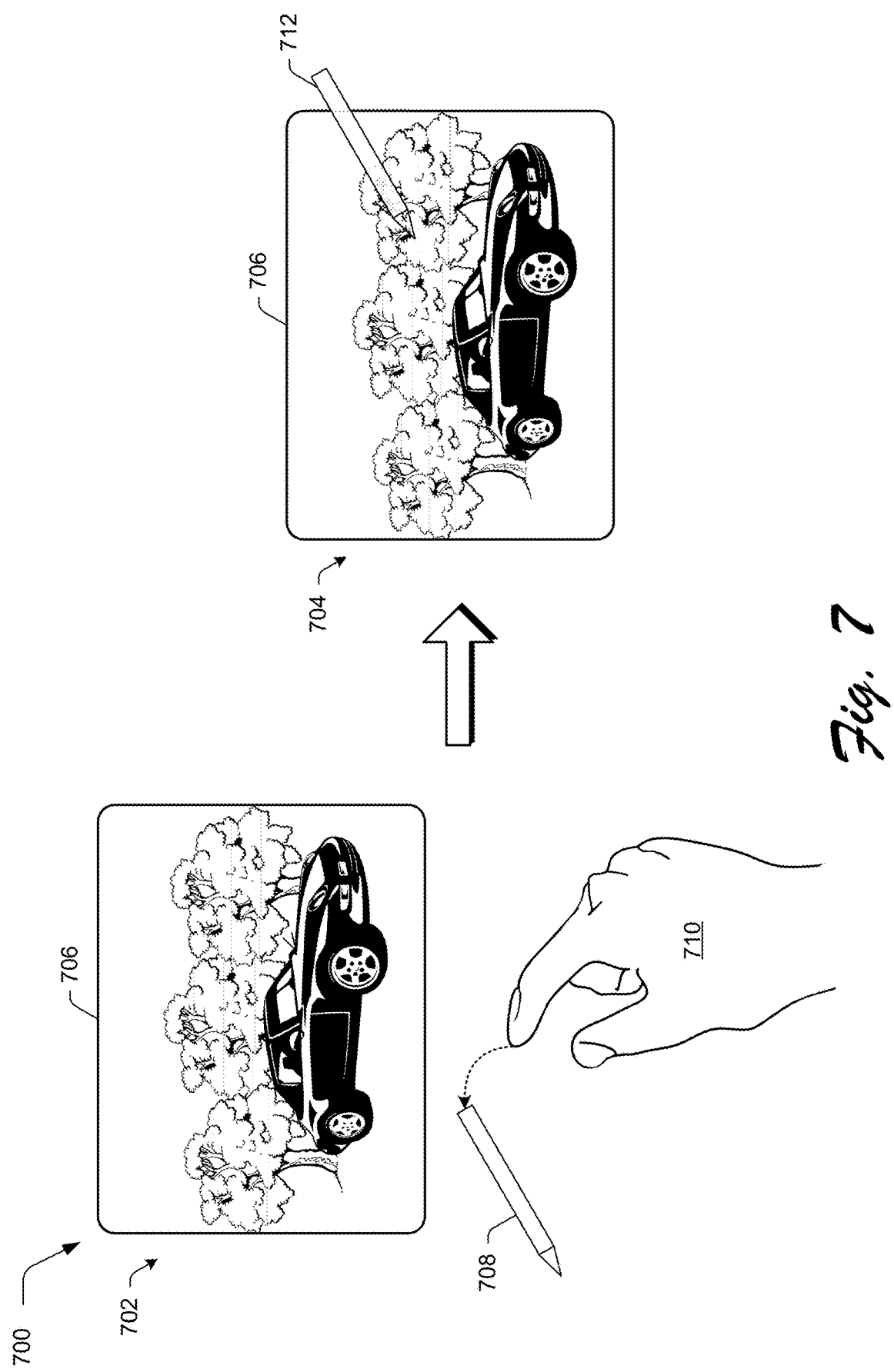
FIG. 7 depicts a system in an example implementation in which digital content is generated that mimics physical interaction of a user of FIG. 6.

FIG. 5 depicts a procedure 500 in an example implementation in which digital content is generated to mimic physical interaction of a user with a physical device to provide haptic feedback. FIG. 6 depicts a system 600 in an example implementation showing an example of user interaction with a physical device, e.g., a mobile computing device in this example. FIG. 7 depicts a system 700 in an example implementation in which digital content is generated that mimics the physical interaction of the user of FIG. 6. The system 700 of FIG. 7 is illustrated using first and second stages 702, 704.

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 5-7.

As previously described, digital content within augmented and virtual reality environment may be used to expand a richness in a user's ability to view and interact with this content. The digital content, for instance, may be used to display virtual objects 108 in a physical environment that "aren't really there" as part of an augmented reality experience. In a virtual reality experience, an entirety of what is viewed by a user 110 is represented using digital content 106. This digital content 106 may represent physical objects that are disposed within a user's environment as well as objects that do not have a physical counterpart in the physical environment of the user 110. Accordingly, a user's interaction with virtual objects 108 that do not have a physical counterpart may lack realism compared with virtual objects that do and may limit an ability of a user to interact with these objects.

As shown in the system 600 of FIG. 6, for instance, a user 110 interacts with the computing device 102 having a head-mounted 120 configuration, e.g., goggles, eye ware, and so on. The computing device 102 includes a virtual reality manager module 126 in this example as part of the user experience module 104 that is configured to generate a virtual reality environment for viewing by the user 110. Other examples are also contemplated, such as through use of the augmented reality manager module 128 of FIG. 1 to generate an augmented reality environment.

The virtual or augmented reality environment in this example is configured to support creation of a digital image 706 within a user interface, an example of which is shown in FIG. 7. As part of creating the digital image 706, the user 110 may desire to draw lines, color objects, and so forth. However, as previously described, the digital image 706 by itself in a conventional augmented or virtual reality environment may lack an ability to provide haptic feedback to the user 110. Rather, the user 110 is conventionally forced to "draw in the air" which may lack precision both in an ability detect what is being drawn and feedback.

Accordingly, in this example supplemental physical devices are used to provide this haptic feedback. Returning again to FIG. 6, the user 110 interacts with a virtual user experience output by a virtual reality manager module 126 as part of a head-mounted 120 configuration. The user, for instance, may view a user interface 402 to create a digital image as described in relation to FIG. 4. In order to draw within the user interface, the user interacts with another physical device, which in this instance is a mobile computing device 602. The user may then draw on the mobile computing device 602 and have inputs detected from this displayed as part of the user interface 402 in a virtual reality experience. In this way, the mobile computing device 602 provides an actual surface with which the user 110 may interact and thus receive detailed feedback regarding "where" this interaction occurs. In one implementation, digital content that represents the physical device is not displayed, thereby reducing clutter in the user interface. Other instances are also contemplated, such as a dedicated peripheral device.

In one example, the mobile computing device 602 includes an application 604 (e.g., obtained from an online application store) that is configured to work with the virtual reality environment. The user may then launch this application 604 and provide inputs detected using an input device 606 of the mobile computing device 602. The inputs, for instance, may be detected using touchscreen functionality such as capacitive, resistive, strain, sensor-in-pixel, IR devices as part of a display device 608, and so forth. The inputs are then communicated via the application 604 to the computing device 102 via a network.

The user, for instance, may grasp a physical device such as a stylus 708 using a hand 710 within the virtual reality environment as shown at the first stage 702 of FIG. 7. As such, the user is not able to view a physical environment in which the physical device is disposed as previously described. Once grasped, digital content 712 is generated that represents the user's 110 interaction with the physical device as shown at the second stage 704 and as previously described in relation to FIGS. 2-5. This digital content may be output in real time to reflect physical movement by the user as it occurs and thus improve accuracy and feedback.

The user 110 may the use the physical device to draw across a surface of the display device 608 of FIG. 6, which is detected and communicated to the computing device 102. The computing device 102 may then display a result of this detected interaction as a "drawn part" of the digital image 706 as part of a virtual or augmented reality environment. Thus, the user may "feel" the drawing against the surface of the mobile computing device 602 as haptic feedback and thereby increase accuracy in interaction of the user 110 with the virtual or augmented reality environment. In this way, a user 110 may leverage a readily available device (e.g., a mobile phone) to expand the user's 110 interaction within an augmented and especially virtual reality environment. Other instances are also contemplated, such as a dedicated peripheral device.

In an implementation, the digital content drawn or other input using the mobile computing device 602 is not displayed by the display device 608 of that device, but rather is viewable solely using the display device 116 of computing device 102. This may be used to preserve resources (e.g., battery) of the mobile computing device 602 by not using the display device 608, promote privacy in interaction with the digital content, and so forth.

Fixed and World Relative Fields of View

Figure 8:
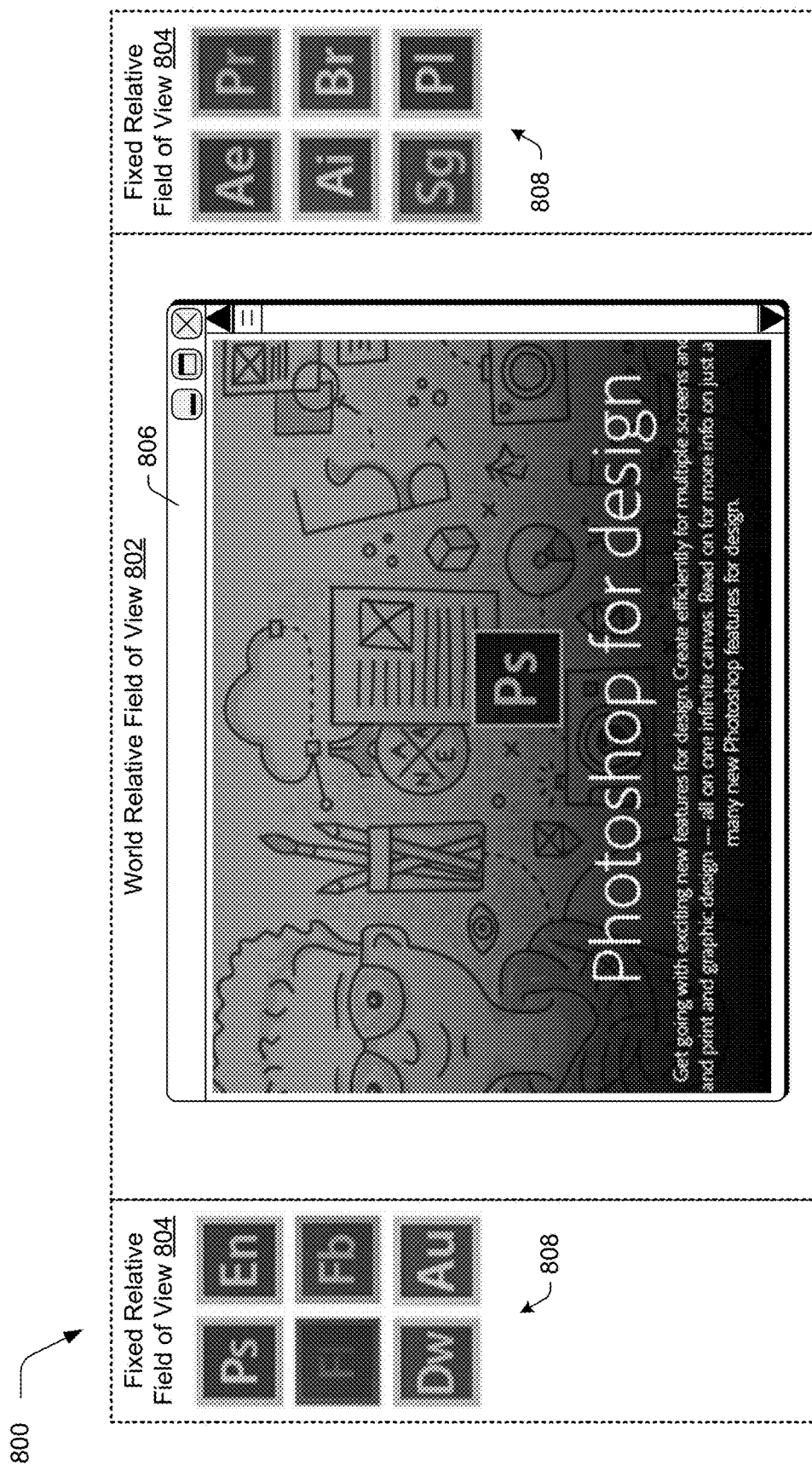
FIG. 8 depicts an example of a user interface viewable as part of an augmented or virtual reality environment that includes fixed and world relative fields of view.
Figure 9:
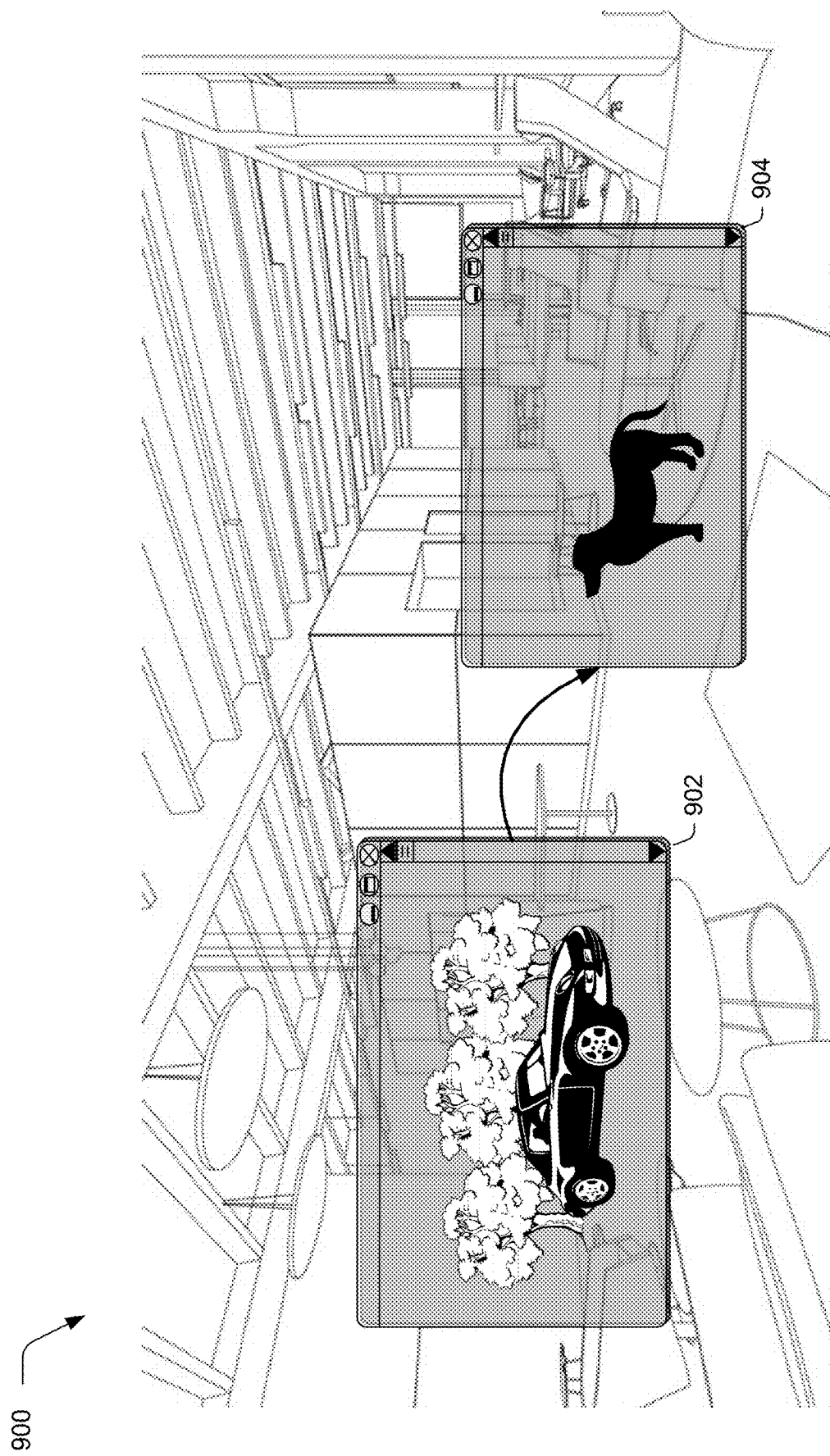
FIG. 9 depicts an example of an augmented or virtual reality environment having a plurality of locations, at which, different user interfaces are displayed.
Figure 10:
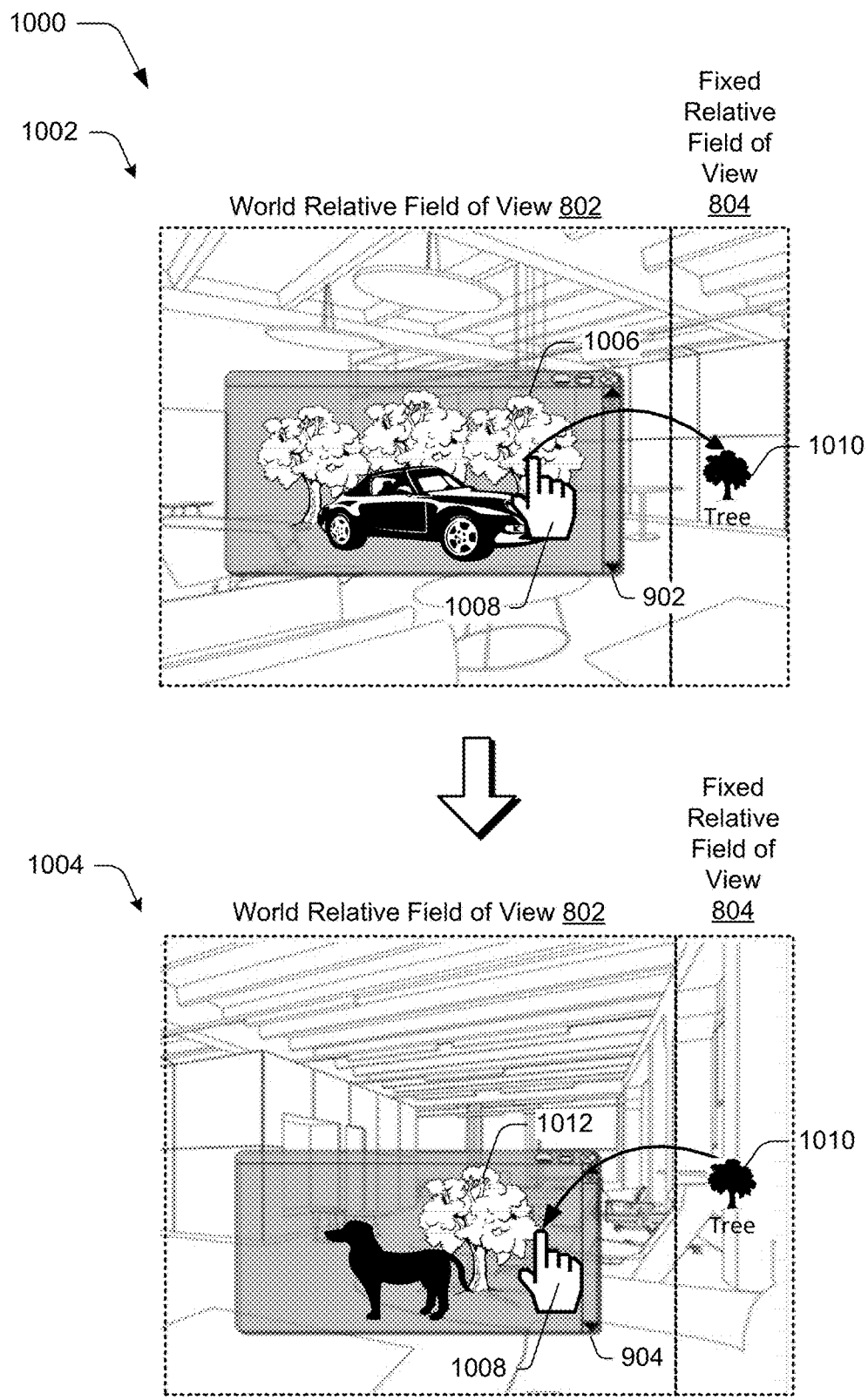
FIG. 10 depicts an example implementation of navigation between the plurality of locations to move digital content through use of the fixed and relative fields of view of FIG. 9.

FIG. 8 depicts an example of a user interface 800 viewable as part of an augmented or virtual reality environment that includes fixed and world relative fields of view. FIG. 9 depicts an example 900 of an augmented or virtual reality environment having a plurality of locations, at which, different user interfaces are displayed. FIG. 10 depicts an example 1000 of navigation between the plurality of locations to move digital content through use of the fixed and relative fields of view of FIG. 9. FIG. 10 is depicted using first and second stages 1002, 1004.

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 8-10.

As previously described, a field of view made available to a user 110 of virtual and augmented reality environments may be quite large, even including 360 degree views in which the user 110 is immersed within these environments. Although this may greatly expand a user's ability to view digital content, this may also introduce challenges involving navigation of these environments.

Accordingly, as shown in the user interface 800 of FIG. 8 fields of view available to a user as part of a virtual or augmented reality environment are portioned to include a world relative field of view 802 and fixed relative field of view 804. The world relative field of view 802 is configured to respond to movement of the user's head, detected by the at least one sensor 116 of the computing device 102, to navigate through the virtual or augmented reality environment. The sensor, for instance, may be configured to detect motion of the user's head when configured in a head-mounted configuration 120 (e.g., goggles) such that the user may look around an augmented or virtual reality environment. The fixed relative field of view, on the other hand, is configured to maintain positioning of digital content in relation to the user's view of the virtual or augmented reality environment regardless of movement of the user's head.

In the illustrated example of a user interface 800 of FIG. 8, for instance, the world relative field of view 802 is configured to include a user interface of an application (e.g., image editing program) via which the user interacts to create a digital image. The fixed relative field of view 804 is configured as a virtual dock, within which, representations of applications 808 and other digital content such as files, documents, and so on are maintained. The representations are selectable to launch execution of the respective digital content by the computing device 102.

The fixed relative field of view 804 is configured to remain at a same relative positioning in relation to a user's 110 field of view of an augmented or physical reality environment regardless of where the user 110 navigates within the environment, e.g., through movement of the user's 110 head. In this way, the world relative field of view 802 permits a user to navigate through the environment while digital content placed within the fixed relative field of view "remains where expected" by the user 110. In one or more implementations, portions of the environment through which the user 110 navigates are also viewable through the fixed relative field of view 804, an example of which is shown in FIG. 10 and thus preserves expansiveness of the environment.

FIGS. 9 and 10 depict examples 900, 1000 of navigation between locations within an augmented or virtual reality environment to move digital content by leveraging use of the fixed relative field of view 804 portion of a user interface. The example 900 of the augmented or virtual reality environment of FIG. 9 includes first and second user interfaces 902, 904 located at respective first and second locations within the environment. In an augmented reality scenario, the walls, ceiling and furniture are part of a direct view by the user 110 of a physical environment, whereas these items are recreated as digital content when part of virtual reality for viewing by the user 110.

In one example, the first and second user interfaces 902, 904 are not capable of being viewed simultaneously by the user 110. Because of this, it may be difficult to move items of digital content between locations within the environment using conventional techniques, such as by using a drag-and-drop in which a user is required to continue an input as part of the drag such that the digital content remains selected. Accordingly, the world and fixed relative fields of view 802, 804 may be used to aid in this navigation and selection, an example of which is described in the following.

At the first stage 1002 of FIG. 10, a user's 110 view of an augmented or virtual reality environment is shown. The view includes a world and fixed relative field of view 802, 804 as previously described. A user interface 902 is included as part of this view, which in this case is configured to create a digital image. In this example, the user wishes to transfer an item of digital content 1006, illustrated as a tree, from the first user interface 902 to the second user interface 904. To do so, a gesture is performed by a hand 1008 of a user 110 that is detected and recognized by the computing device 102 as initiating movement of the digital content 1006 from the user interface 902 in the world relative field of view 802 to the fixed relative field of view 804.

In response, the view control module 130 of FIG. 1 includes a representation 1010 of the item of digital content 1008 in the fixed relative field of view 804 portion. As part of this, the view control module 130 may incorporate a summary engine to generate the representation 1010, such as to have a reduced resolution, display size, reduced textual description made by parsing copied text for meaningful words, and so forth.

A user 110 then navigates to a second location from the first location at which user interface 904 is disposed through movement of the user's head, e.g., by movement of the user's head as a whole, eyes, and so forth as shown at the second stage 1004. At the second location, the second user interface 904 is viewable by the user as part of the world relative field of view 802, although it may also be viewable in whole or in part as part of the fixed relative field of view 804.

The user 110 then initiates a transfer of the digital content represented in the fixed relative field of view 804 to the user interface 904 in the world relative field of view 802. In this example, a gesture is again detected to select the representation 1010 and drag it to the user interface 904, e.g., by detecting motion of a user's hand 1008 as part of a natural user interface using sensors 118 such as a camera. In response, the view control module 130 causes the digital content 1012 of the tree to be positioned from the fixed relative field of view 804 into the user interface 904 located at the second position within the environment. In this way, a user may efficiently select and relocate digital content within the expanded environments made possible in augmented and virtual reality environments, which was not possible using traditional techniques.

Example System and Device

FIG. 11 illustrates an example system generally at 1100 that includes an example computing device 1102 that is representative of one or more computing systems and/or devices that may implement the various techniques described herein. This is illustrated through inclusion of the user experience manager module 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control display of digital content, a method implemented by a computing device, the method comprising:
   outputting, by a display device of the computing device, a virtual or augmented reality environment;
   rendering, by the display device of the computing device as part of the virtual or augmented reality environment:
      a world relative field of view configured to respond to movement to navigate through the virtual or augmented reality environment; and
      a fixed relative field of view configured to maintain positioning of digital content in relation to the user's view of the virtual or augmented reality environment regardless of the movement;
   receiving, by the computing device, a user input indicative of selection of an item of digital content at a location within the virtual or augmented reality environment as part of the world relative field of view; and
   generating, by the computing device, a representation of the item of digital content as included within the fixed relative field of view.

2. The method as recited in claim 1, wherein the world relative field of view is further configured to include a user interface of an image editing application, the image editing application enabling the user to create a digital image.

3. The method as recited in claim 1, wherein digital content is maintained within the fixed relative field of view, the digital content including an icon selectable to launch an application, file, or document.

4. The method as recited in claim 1, wherein portions of the virtual or augmented reality environment through which the user navigates by the movement are viewable through the fixed relative field of view.

5. The method as recited in claim 1, wherein the representation is generated to have a reduced resolution, a reduced display size, or a reduced textual description generated by parsing copied text for meaningful words.

6. The method as recited in claim 1, wherein the user input indicative of the selection of the item of digital content is performed by a gesture by the user and recognized by the computing device.

7. The method as recited in claim 6, further comprising detecting, by the computing device, an additional gesture by the user corresponding to movement of the item of digital content from the location within the virtual or augmented reality environment to a location within the fixed relative field of view.

8. The method as recited in claim 1, further comprising:
   detecting navigation from the location within the virtual or augmented reality environment to an additional location within the virtual or augmented reality environment;
   responsive to receipt of a user input indicative of selection of the representation of the item of digital content as included within the fixed relative field of view, displaying the item of digital content at the additional location within the world relative field of view of the virtual or augmented reality environment; and
   displaying the item of digital content to remain at the additional location within the virtual or augmented reality environment responsive to subsequent detection of movement.

9. In a digital medium environment to control display of digital content, a system comprising:
   a physical device including a display having touchscreen functionality, the physical device configured to provide haptic feedback corresponding to user interaction with the physical device, the user interaction including a drawing input using the touchscreen functionality of the display; and a display device configured to:
    output a virtual or augmented reality environment;
    detect the user interaction with the physical device including the drawing input using the touchscreen functionality of the display;
    responsive to the detection of the user interaction, generate digital content that is viewable as part of the virtual or augmented reality environment that mimics the detected user interaction between the physical device and the display having the touchscreen functionality including a result of the detected user interaction corresponding to the drawing input for display as part of the virtual or augmented reality environment; and
    render the generated digital content as part of the virtual or augmented reality environment.

10. The system of claim 9, wherein the display device is further configured to output a user interface as part of the virtual or augmented reality environment, the user interface configured to:
    create digital images based at least in part on the drawing input; and
    display representations of tools selectable by the user for use in the creation of the digital images.

11. The system of claim 9, further including a peripheral device communicatively coupled to the display device to aid in the user interaction with the physical device.

12. The system of claim 11, wherein one or more virtual objects of the virtual or augmented reality environment initially obstruct a view of the peripheral device; and
    responsive to detection of a hand of a user moving within a threshold distance of the peripheral device, configuring, by the display device, digital content to aid in an interaction with the peripheral device.

13. The system of claim 12, wherein the detection of the hand of the user is performed by one or more of:
    a camera of the display device and object recognition of the peripheral device and the hand of the user;
    a radar device of the display device;
    an ultrasonic device of the display device; or
    capacitive sensors of the display device.

14. The system of claim 11, wherein the display device is further configured to render digital content corresponding to the peripheral device to aid in the user interaction with the physical device as part of the virtual or augmented reality environment, the digital content corresponding to the peripheral device being at least partially translucent such that portions of the virtual or augmented reality environment are viewable through the digital content corresponding to the peripheral device.

15. The system of claim 11, wherein the peripheral device is used with the touchscreen functionality of the physical device to execute the drawing input and provide the haptic feedback corresponding to the user interaction.

16. The system of claim 9, wherein the digital content rendered by the display device does not include a representation of the physical device.

17. The system of claim 9, wherein the result of the detected user interaction corresponding to the drawing input is not displayed by the display of the physical device.

18. In a digital medium environment to control display of digital content, a method implemented by a computing device, the method comprising:
    outputting, by a display device of the computing device, a user interface as part of virtual or augmented reality environment;
    rendering, by the display device of the computing device as part of the virtual or augmented reality environment:
        a world relative field of view configured to respond to movement to navigate through the virtual or augmented reality environment, and enable interaction with the user interface to create digital content; and
        a fixed relative field of view configured to maintain positioning of fixed digital content in relation to the user's view of the virtual or augmented reality environment regardless of the movement, the fixed digital content being selectable in the fixed relative field of view to launch execution of the fixed digital content by the computing device;
    receiving, by the computing device, a user input indicative of selection of an item of digital content at a location within the virtual or augmented reality environment as part of the world relative field of view; and
    generating, by the computing device, a representation of the item of digital content as included within the fixed relative field of view.

19. The method as recited in claim 18, further comprising:
    detecting user selection of another computing device; and
    responsive to receipt of the detection of the user selection, causing the item of digital content to be communicated from the computing device to the other computing device.

20. The method as recited in claim 18, further comprising:
    detecting navigation from the location within the virtual or augmented reality environment to an additional location within the virtual or augmented reality environment; and
    responsive to receipt of a user input indicative of selection of the representation of the item of digital content as included within the fixed relative field of view, displaying the item of digital content at the additional location within the world relative field of view of the virtual or augmented reality environment, wherein the representation of the item of digital content is configured for display using a reduced resolution in the fixed relative field of view in comparison with display of the item of digital content in the world relative field of view.

* * * * *